Sept. 18, 1928. 1,684,699

F. M. HARSIN

TIRE CARRIER AND TOOL KIT

Filed Feb. 9, 1926

F.M.Harsin, Inventor

By Ralph T. Barrett
Attorney

Patented Sept. 18, 1928.

1,684,699

UNITED STATES PATENT OFFICE.

FRANK M. HARSIN, OF NAMPA, IDAHO, ASSIGNOR OF ONE-HALF TO A. D. LEEDY, OF PORTLAND, OREGON.

TIRE CARRIER AND TOOL KIT.

Application filed February 9, 1926. Serial No. 87,098.

This invention relates to a combined tire carrier and tool kit.

The object of this invention is to provide a device of this character embodying a tire carrier of closed construction to protect the tire and also to utilize the space within the tire rim for a plurality of compartments or shelves capable of carrying the conventional equipment utilized in connection with the present automobile.

Other objects reside in designing the parts in such a manner as to produce a construction having an artistic and pleasing appearance and at the same time provide a strong, convenient arrangement of parts including illuminating means to facilitate the utilization of the interior.

Reference will be had to the accompanying drawings forming a part of this specification and wherein like numerals of reference designate corresponding parts throughout the several views in which.

Figures 1, 2:
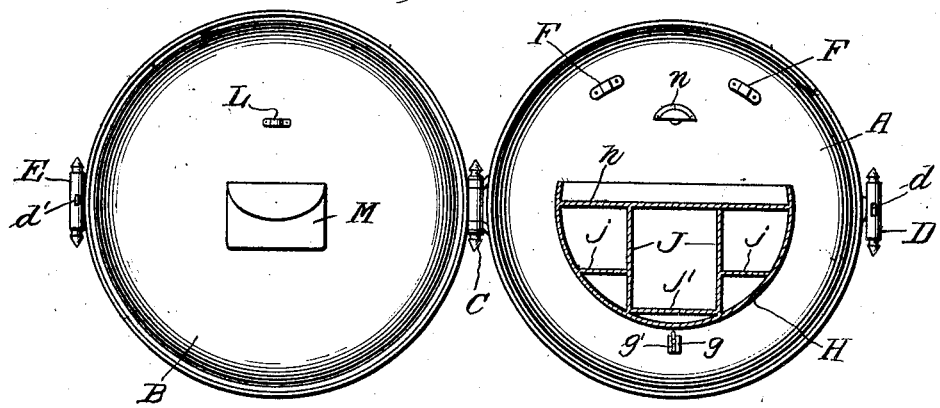
Figure 1 is a side elevation showing the invention in open position.
Figure 2 is a vertical sectional view.

The present combined tire carrier and tool chest includes the fixed section A and the outer section B, the latter being hinged to the fixed section A by means of the hinge C. Locking means are provided including the cylindrical member D fixed to the hinged outer section or closure B provided with a central opening $d$ for the reception of the tongue $d'$ carried by the member E which corresponds to the member D of the closure in outline and design. Attention is called to the fact that the construction of the locking means is such that same will correspond in general appearance to the construction of the hinge, and being arranged diagrammatically opposite thereto will give a pleasing and artistic appearance to the assembly. The actual locking is produced by passing a suitable lock through a perforation in the tongue $d'$ after the latter has passed through the opening in the member D.

The tire carrying or supporting means includes the fixed upper notched brackets F welded, or riveted within the section A and arranged in spaced relation tangentially of an imaginary circle corresponding to the inner circumference of a tire rim. A lower bracket G is also provided and includes a rim engaging shoulder, a removable lug or clamp $g$ and a locking screw $g'$ therefor as shown clearly in Figure 3. The notches in the brackets F and the rim engaging shoulder and clamp ($g$) of the bracket G will effectively locate a tire out of contact with the walls of the carrier casing.

A plurality of receptacles are arranged within the tire carrier and within the space outlined by the tire rim. These receptacles may be formed of stamped sheet metal or otherwise to include a semi-circular base member H and the upper shelf $h$ which extends entirely across the receptacle and connects with the latter at points spaced equally from the upper extremities of the side walls of the base portion. Vertical spaced partitions J are also provided in the present illustration and in conjunction with these vertical partitions are the horizontal shelves $j$ and $j'$. The foregoing arrangement of parts creates a structure including a plurality of receptacles partially closed at their front by means of the flanges K which extend upwardly in proportion to the size of the particular chamber of which it may form a part. The entire arrangement above outlined is supported and forms a fixed construction with relation to the fixed section A of the tire carrier.

The hinged outer section B has affixed thereto a suitably constructed clip L and a pocket or pouch M suitable for the reception of a clutch or smaller articles conventional in an automobile kit. The pocket M may be made of cloth, leather, or a waterproof material and the size thereof will be determined by the size of the carrier of which it forms a part.

A light N is arranged above the various tool shelves and a reflector $n$ is located thereabove to direct the light below. A handle P of artistic design is fixed centrally of the hinged section B to facilitate the movement of the latter. Attention is also directed to the flange off-set from the section B at its outer edge to seat over the adjacent edge of the fixed section A. This arrangement is designed to prevent the passage of water or dust.

Various changes in details of construction and arrangement of parts can be made without departing from the spirit of the invention, it being obvious that the size and arrangement of the shelves may be altered to facilitate the arrangement of jacks, pumps and other accessories forming a part of the conventional equipment.

What I claim as new and useful and desire to secure by Letters Patent is:

In a tire carrier, an imperforate casing comprising substantially identical sections, each section being of dish shape, and one section being fixed and the other hinged to the fixed section, a pair of spaced elongated brackets projecting axially from and secured to the upper part of the fixed section, said brackets being notched to receive and engage the sides and inner faces of a pneumatic tire rim for locating and clamping the rim to support the tire entirely out of contact with the casing, a single bracket projecting axially from and secured to the lower part of the fixed section of the casing, said single bracket having a recess forming a shoulder, and an adjustable lug carried by the end of the bracket opposite the shoulder, to form with the recess, a third notch, the medial portions of the notches being intersected by a plane flush with the edge of the fixed section to permit the operator to remove the tire from the casing without rubbing his fingers against the latter.

In testimony whereof I affix my signature.

FRANK M. HARSIN.